Patented Mar. 11, 1941

2,234,708

UNITED STATES PATENT OFFICE 2,234,708

TREATMENT OF STILL RESIDUES

Joseph Rivkin, Pittsburgh, Pa., assignor to The Neville Company, Pittsburgh, Pa., a corporation of Pennsylvania No Drawing. Application August 5, 1938, Serial No. 223,249

4 Claims. (Cl. 196—13)

This invention relates to the treatment of pure still residue resulting from the refinement and purification of coke oven light oil fractions, and a major object of the invention is to provide a simple, cheap and efficient method of classifying such residue into its component parts.

In the high temperature by-product coking of coal the common practice is to scrub the aromatic light oils from the oven gases with a wash oil, the resulting solution being then distilled to produce a mixture of light oils, chiefly benzol, toluol, xylol and solvent naphtha. The mixture of light oils is then fractionated to obtain somewhat impure cuts of the individual constituents. These crude fractions, or cuts, are usually acid washed by agitating them vigorously with an amount of strong sulfuric acid, which polymerizes the polymerizable constituents and produces a mixture of high boiling oil and resinous bodies, and because the temperature is not controlled in this step, rise in temperature may cause other reactions to take place with forms of other oils and resins. After separation from the sulfuric acid stratum the fraction being treated is washed with alkali, to neutralize residual acid, following which it is distilled to produce a commercially pure solvent, leaving in the still a residue of material containing the polymers and high boiling oils referred to, and inorganic matter or ash. Because the purpose of this last distillation step is to produce commercially pure solvents the stills used are known in the art as "pure stills," and for the same reason the residues are known as pure still residue. The alkali washing referred to removes the greater part of low molecular weight sulfonates, which are soluble in water but substantially insoluble in organic solvents, but leaves in the mixture sulfonates of the resins, i. e., resinous sulfonates, which are of high molecular weight and insoluble in water although soluble in organic solvents.

Pure still residue may be considered to be made up of high boiling oils and two types of resin, one a thermoplastic resin which is completely fusible and of good solubility, and which constitutes the bulk of the total resins, together with an amount of resinous sulfonates. The other is a resin which is either infusible or difficultly fusible and of poor solubility characteristics, and it constitutes but a small proportion of the total resins. Finally, the pure still residue contains a substantial amount of inorganic matter, or ash, commonly in the vicinity of 7 or 8 per cent.

The high boiling oils contained in pure still residue may be recovered readily by distillation, for instance steam distillation, leaving a mixture of the two resin fractions together with the ash. The resin thus produced is of virtually no commercial value because of its mixed nature with respect to fusibility and solubility, and because the removal of high boiling oils so increases the ash content (commonly to 18 or 20 per cent) as to render the material undesirable for most purposes to which resins are applied.

The thermoplastic resin fraction has properties which would render it of general utility for purposes to which thermoplastic resins are applied. The infusible resin fraction possesses properties which would render it useful in the production of compositions combining high melting point and high penetration characteristics, as in the manufacture of mastic floor tile or protective coating materials for pipe, and the like. For instance, it is desired for some purposes to provide plastic materials which possess not only satisfactorily high melting point and penetration at the temperature of use, but which also maintain satisfactory relations of these properties with changes in temperature encountered in normal use. The infusible resin fraction is adapted to the production of such compositions, and favoring this use it has been found to be readily dispersible in fusible resinous masses and oils.

To obtain the benefits of the characteristics just stated it is necessary to separate the resin fractions from each other, and particularly the thermoplastic resin should be almost free from the ash content which the pure still residues carry. All attempts to do this by solution and filtration procedures have been frustrated, as far as I am aware, by the nature of the difficultly fusible resin fraction. Because the resins contained in pure still residue can be dissolved in aromatic solvents, such as the oils carried by pure still residue, it might be supposed that they could be separated from the ash content most simply by the use of such aromatic solvents. I have discovered, however, that such is not the case. The fusible resin fraction dissolves in aromatic solvents, but the infusible resin fraction is gelatinized or in some other manner acted upon by the solvent to cause the solution to be slimy and highly resistant to filtration. The addition of filter aids does not noticeably improve the filtering characteristics of these solutions.

This action of aromatic solvents is peculiar to pure still residue as far as I know, and I am aware of no analogy to this condition in other materials derived from coal or petroleum. This property of the infusible resin fraction of producing a solution in aromatic solvents which either promptly renders filter media inpenetrable to the passage of the solution, or renders the filtration rate negligible, has prevented earlier attempts to isolate and separate the resin fractions. In consequence the practice heretofore has been to burn pure still residue, or to mix it with coal tar, as a ready means of disposing of the residue without added cost.

The foregoing behavior of the infusible resin fraction might lead to the belief that it would exhibit similar action with other solvents. I have discovered, and it is upon this that my invention is predicated, that the foregoing difficulties are completely overcome by heating the material with a petroleum solvent, preferably by heating them together, to dissolve the fusible resin fraction, and filtering the solution, preferably while in a heated condition. I have discovered that in this manner the fusible resin can be separated from the infusible resin, and in a form carrying very little ash, as is necessary to resins of this class, whereby the two resinous materials are recovered separate from one another in forms such that they can be applied individually to useful ends. The two essentials for well defined separation of the two types of resin are the use of petroleum solvent and filtering while the solution is heated. The petroleum solvent does not take up the inorganic matter or the infusible resin to any substantial extent, and, surprisingly enough, it does not produce slimy, difficultly filterable solutions. To the contrary, the solutions filter rapidly and readily, and there is no tendency toward clogging of filter media such as is encountered when aromatic solvent is used.

If desired, a filter aid may be added to the solution prior to filtration. Preferably there is used for this purpose an adsorbent, such as fuller's earth, and most suitably "Superfiltrol," Attapulgus, or other activated clay. This is not necessary to the practice of the invention, but generally speaking the use of such an agent is desirable; thus, these activated clays tend to produce resin of lighter color than where such an agent is not used. The resin may be bleached also in other ways, as by hydrogenation of the solution in the presence of a hydrogenation catalyst.

The thermoplastic resin is recovered readily from the filtrate by distillation, suitably in vacuum. Or, the petroleum solvent may be distilled at atmospheric pressure, followed by steam distilling to strip the resin of the high boiling oils initially present in the pure still residue. The resin is left as a residue, usually transparent and of dark red color, and its melting point will vary depending on how thoroughly the oils have been removed.

The filter cake left after filtration consists substantially of infusible resin and inorganic matter originally present in the pure still residue, together with filter aid where it has been used.

In addition to thus classifying the resin into a fraction which is insoluble and infusible and a fraction which is soluble and fusible, the invention likewise classifies the sulfonates. That is, due to their solubility relations the resinous sulfonates of high molecular weight appear in the soluble and fusible resin fraction, while any low molecular weight sulfonates present appear in the insoluble and infusible resin fraction.

The benefits to be derived from the invention are illustrated by the following tests. In one of them 100 cc. of pure still residue were mixed with 200 cc. of benzol and 6 grams of Attapulgus clay. The mixture was heated for one hour at incipient boil, and an attempt was then made to filter it. The solution was at a temperature of 65° C. when filtration was initiated. In three hours less than one-third of the batch had filtered through, and the filtration rate had become virtually zero due to plugging of the filter medium by the slime resulting from the action of benzol upon the infusible resin.

In contrast, and exemplifying the practice of the invention, 100 cc. of pure still residue were mixed with 200 cc. of petroleum benzine and 6 grams of Attapulgus clay and heated one hour at 60° C. and then filtered in the same manner as in the preceding test. The mixture was at a temperature of 50° C. when filtration was initiated, and filtration was wholly completed in sixteen minutes, at the end of which time the temperature of the solution was 28° C. so that it was still above room temperature. The filtrate was distilled with live steam to remove the solvent, and in this manner there were recovered 44 grams of thermoplastic resin having a melting point of 90° C. and containing only 0.77 per cent of ash.

In another test the pure still residue, petroleum benzine and clay were mixed in the same proportions and heated one hour at incipient boil. Filtration was commenced with the mixture at a temperature of 76° C., and filtration was completed in eighteen minutes, the filtrate being then at a temperature of 34° C.

In the practice of the invention, therefore, the difficulties heretofore confronting the art are overcome, and the two resin fractions are adequately, quickly and cheaply separated. The thermoplastic resin is recovered in a form in which it is applicable to commercial uses, and the separation is clean. The difficultly fusible resin is obtained also in a form in which it is adapted to the uses alluded to hereinabove.

While the invention is explained with reference to its application to pure still residue, it is to be understood that it is equally applicable to the resinous residue obtained after removal of the high boiling oil content of pure still residue. That is, pure still residue may be steam distilled to strip out the high boiling oils more or less completely, leaving a mixture of resins and inorganic matter. This residue may then be heated with petroleum solvent, suitably with agitation and with the resin in crushed form, and the solution of fusible resin filtered hot, as described hereinabove, to separate it from the insoluble infusible resin fraction. In this instance it is necessary only to subject the filtrate to ordinary distillation at atmospheric pressure to remove the petroleum solvent. It will be clear, however, that in both instances the resinous material is treated with petroleum solvent. The term "petroleum solvent" as used herein has reference to the common solvents derived from petroleum, i. e., gasoline, petroleum benzine, petroleum naphtha, mineral spirits and kerosene, all of which may be termed petroleum naphtha solvents for brevity and because of their closely related character.

This application is a continuation-in-part of my copending application Serial No. 120,138, filed January 11, 1937.

According to the provisions of the Patent Statutes, I have explained the principle of my invention and have described what I now consider to represent its best embodiment. However, I desire to have it understood that, within the scope of the appended claims, the invention may be practiced otherwise than as specifically described.

I claim:

1. That method of classifying resin contained in pure still residue resultant from distillation of light oil fractions produced in refinement and purification of coke oven light oils, which comprises the steps of heating the resinous material with petroleum naphtha solvent and thereby dissolving a fusible resin fraction soluble therein, filtering the solution heated substantially above about 28° C. to separate it from insoluble resin and inorganic matter, and distilling solvent from the filtrate to recover said fusible resin substantially free from inorganic matter and said insoluble resin.

2. That method of classifying resin contained in pure still residue resultant from distillation of light oil fractions produced in refinement and purification of coke oven light oils, which comprises the steps of heating the resinous material with petroleum naphtha solvent and thereby dissolving a fusible resin fraction soluble therein, adding adsorbent clay, filtering the solution heated substantially about above 28° C. to separate it from insoluble resin and inorganic matter, and distilling solvent from the filtrate to recover said fusible resin substantially free from inorganic matter and said insoluble resin.

3. That method of classifying resin contained in pure still residue resultant from distillation of light oil fractions produced in refinement and purification of coke oven light oils, which comprises the steps of distilling said residue to remove oils contained therein, heating the residue of said distillation with petroleum naphtha solvent and thereby dissolving a fusible resin fraction soluble therein, filtering the solution heated substantially above about 28° C. to separate it from insoluble resin and inorganic matter, and distilling solvent from the filtrate to recover said fusible resin substantially free from inorganic matter and said insoluble resin.

4. That method of classifying resin contained in pure still residue resultant from distillation of light oil fractions produced in refinement and purification of coke oven light oils, which comprises the steps of distilling said residue to remove oils contained therein, heating the residue of said distillation with petroleum naphtha solvent and thereby dissolving a fusible resin fraction soluble therein, adding adsorbent clay, filtering the solution heated substantially above about 28° C. to separate it from insoluble resin and inorganic matter, and distilling solvent from the filtrate to recover said fusible resin substantially free from inorganic matter and said insoluble resin.

JOSEPH RIVKIN.